Figure 1:
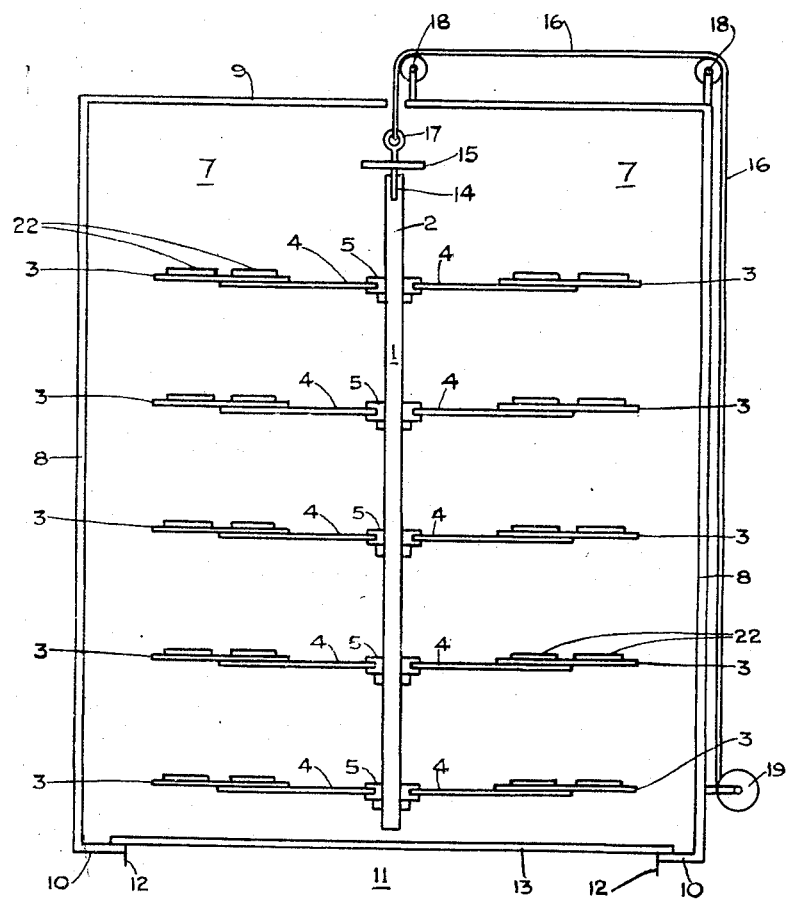

Aug. 21, 1956  L. A. DAUNCEY  2,759,803
METHODS FOR USE IN THE GROWING OF CRYSTALS
Filed May 21, 1951  2 Sheets-Sheet 1

INVENTOR
LEONARD ARTHUR DAUNCEY
BY
ATTORNEY

United States Patent Office 2,759,803
Patented Aug. 21, 1956

2,759,803

METHODS FOR USE IN THE GROWING OF CRYSTALS

Leonard Arthur Dauncey, Wembley, England, assignor to The General Electric Company Limited, London, England Application May 21, 1951, Serial No. 227,321

Claims priority, application Great Britain May 22, 1950

4 Claims. (Cl. 23—301)

This invention relates to methods for use in the growing of crystals.

Crystal growing apparatus is known in which a number of seed crystals of the material of the crystals to be grown are mounted in a tank containing a supersaturated solution of the said material. As the material is deposited from the solution on to the growing crystals, the temperature of the solution in the tank must be lowered to maintain the solution in a supersaturated condition. Alternatively, as described in co-pending U. S. patent application Ser. No. 227,323, now abandonded, the solution in the tank may be maintained at a constant temperature and is continuously circulated through a recharging column where its concentration is increased by passing over solid solute material at a temperature a few degrees higher than the temperature of the tank solution.

In the use of the crystal growing apparatus the tank and the solution may be maintained at a temperaure or within a range of temperatures substantially different from the ambient temperature. A difficulty arises when the seed crystals have been mounted on the supports provided, outside the tank, and have then to be introduced assembled on the supports into the tank which is at a different temperature to that of the seed crystals, since the seed crystals are very liable to crack when subjected to sudden temperature changes. A similar difficulty occurs when it is desired to remove the grown crystals from the tank, as these are even more liable to crack, on account of their greater size, than the seed crystals.

To attempt to overcome these difficulties a method has been used of providing an oven in which the seed crystals may be gradually brought to the temperature of the tank, and from which they are rapidly transferred to the tank when they have reached the tank temperature. In the same way the grown crystals may be transferred rapidly from the tank to an oven at tank temperature and the oven temperature is then subsequently gradually lowered to the ambient temperature. It is found however that even the temperature changes involved in the brief period of transference from oven to tank or vice versa are still sufficient to be liable to cause damage, particularly to the grown crystals.

Alternatively it has been proposed that the crystal growing apparatus should be sited in a thermostically controlled room, and that the ambient temperature should be raised to that of the tank during the operations of inserting or removing crystals from the tank, the ambient temperature being gradually brought to or from the tank temperature as the case may be. Although efficient, this method has the disadvantage of being complicated and expensive, and also in some cases of causing physical discomfort to operators having to work in extreme temperatures.

It is an object of the present invention to provide methods of inserting seed crystals in and removing crystals from a crystal growing tank, which is at a substantially different temperature to the ambient temperature.

According to one feature of the present invention a method of inserting seed crystals in a crystal-growing tank containing a solution at a temperature different from that of the seed crystals, comprises the steps of mounting at least one seed crystal on the support to be used in the crystal growing tank in a temperature controlled enclosure previously brought to substantially the same temperature as the seed crystal, slowly bringing the temperature of the enclosure to that of the solution in the crystal-growing tank and then maintaining it at that temperature, arranging the enclosure and the crystal growing tank in positions with the enclosure over the crystal growing tank so that on moving aside a movable part of the floor of the enclosure the crystal growing tank and the enclosure form substantially a continuous uniform temperature enclosure, moving aside the said movable part of the floor of the enclosure, and lowering the support with at least one seed crystal mounted on it through the floor of the enclosure into the crystal growing tank.

According to a further feature of the present invention a method of removing crystals from a crystal growing tank, into surroundings at a different temperature from that of the crystals in the crystal growing tank, comprises the steps of bringing a temperature controlled enclosure to substantially the same temperature as the crystals in the crystal growing tank, arranging the enclosure and the crystal growing tank in position with the enclosure over the crystal growing tank so that on moving aside a movable part of the floor of the enclosure the crystal growing tank and the enclosure form substantially a continuous uniform temperature enclosure, moving aside the said movable part of the floor of the enclosure, raising a support on which at least one crystal is mounted in the crystal growing tank from the crystal growing tank through the floor of the enclosure into the enclosure, moving the movable part of the floor back into position again, gradually bringing the temperature of the enclosure to that of the said surroundings, and removing the crystals from the enclosure into the said surroundings.

Figure 2:
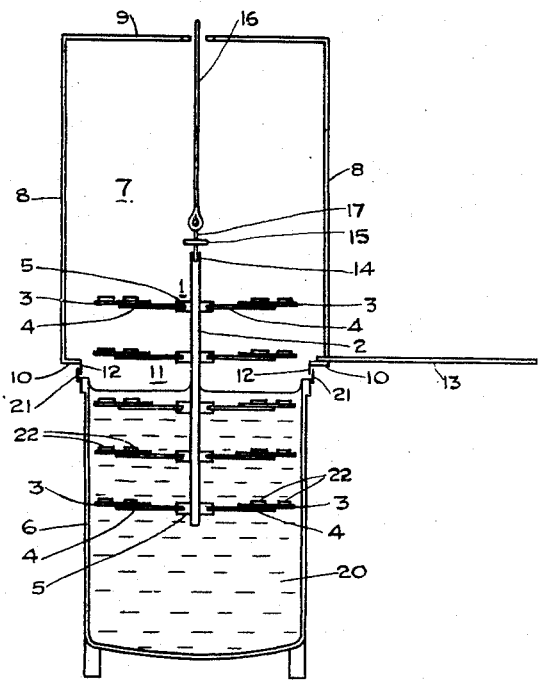

One method of carrying out the present invention will now be described by way of example, with reference to the accompanying diagrammatic drawing in which Figure 1 shows a cross sectional diagram of seed crystals mounted on a support in an oven, and Figure 2 shows a cross sectional diagram of seed crystals mounted on a support being lowered through the floor of the oven into a crystal growing tank.

In the aforesaid patent application, Ser. No. 227,323 there is described apparatus for growing crystals of ethylene diamine tartrate, from aqueous solutions at temperatures lying approximately between 40° C. and 55° C. The temperature of the atmosphere surrounding the crystal growing tank may be in the range 10° C. to 20° C. in a country of moderate climate, and in inserting seed crystals from outside into the tank, or in removing grown crystals from the tank, the crystals would undergo sudden temperature changes of approximately 30° C. which would be sufficient to cause a substantial risk of damage to the crystals.

A support 1 used for mounting crystals in the crystal growing tank in the aforesaid apparatus is shown in both Figures 1 and 2 of the accompanying drawing. It comprises simply a stainless steel shaft 2 to which circular horizontal shelves 3 of methyl methacrylate plastic are secured by struts 4 projecting from collars 5 on the shaft 2. The crystal growing tank 6 (Figure 2, in which some references identical with those of Figure 1 have been omitted) is a cylindrical stainless steel one, and the support 1 is, in operation of the apparatus, rotatably supported by a bearing centrally in the lid of the tank (the lid and the bearing are not shown in the drawing). When supported in position in the tank 6, the support 1 extends almost to the bottom of the tank 6 and may rotate about the longitudinal axis of the shaft 2.

Mounts are provided for securing crystals in position on the shelves 3. These may be of any suitable form but are preferably in accordance with U. S. patent application, Ser. No. 232,360.

To insert a batch of seed crystals into the tank, the support 1 is removed from the tank and dried and the seed crystals 22 are secured on the shelves 3. The support 1 with the seed crystals in position is then suspended in an oven 7 the interior of which has previously been brought to the same temperature as the seed crystals and the support 1, that is to say the ambient temperature.

The oven 7 consists simply of a rectangular box mainly of heat insulating material, one suitable construction being a steel frame to which sheets of synthetic resin material are secured to form the walls 8 and the top 9. The floor of the oven is formed by a fixed part 10 having a circular hole 11 in it, from around which there projects a steel rim 12. The hole 11 may be covered or uncovered at will by sliding in and out a movable part 13 of the floor, shown in position covering the hole 11 in Figure 1 and shown withdrawn in Figure 2. The diameter of the rim 12 is approximately equal to the external diameter of the outwardly projecting lip of the tank 6.

Heating elements (not shown in the drawing) are provided inside the oven 7, for example electric lamps or wire wound resistors. The heaters are supplied with power from an A. C. mains supply through a variable auto-transformer, adjustment of which enables the temperature of the oven 7 to be controlled. The auto-transformer together with fuses and switches is mounted on a control panel secured to the frame on the outside of the oven 7. A thermometer for reading the internal temperature of the oven is provided.

The shaft 2 has in its upper end a central threaded hole into which a bolt 14 having a knurled head 15 may be screwed. A cord 16 is secured through an eye 17 which is swivel mounted on the head 15. The cord 16 passes over pulleys 18 and is wound on to a small hand winch 19. The pulleys 18 and winch 19 are indicated only diagrammatically in the drawing, and in practice are mounted on the steel frame or extensions thereof of the oven 7.

To suspend the support 1 and the seed crystals 22 mounted on it in the oven 7, when it has been brought to the ambient temperature, the movable part 13 is withdrawn, the winch 19 is unwound until the end of the bolt 14 on the end of the cord 16 projects through the hole 11, and the bolt 14 is screwed into the upper end of the shaft 2 which is positioned ready under the oven 7. The winch 19 is then wound up until the support 1 is within the oven 7 and the movable part 13 is then pushed back into position to cover the hole 11.

The control of the auto-transformer is gradually adjusted until the temperature inside the oven 7 is brought to that of the solution 20 in the tank 6, and is maintained at the temperature for a period. The oven 7 is then positioned over the tank 6, which has its lid removed, with the rim 11 over the tank 6, and a broad rubber band 21, which is normally used to seal the joint between the tank 6 and its lid, is slipped up to cover the gap between the rim 11 and the lip of the tank 6. The movable part 13 is then withdrawn, so that the oven 7 and the tank 6 become a continuous uniform temperature enclosure.

The winch 19 is then unwound to lower the support 1 through the hole 11 into the tank 6, this step being shown partially completed in Figure 2. When the bottom of the shaft 2 rests on the bottom of the tank 6 the rubber band 21 is slipped off the rim 12 and the bolt 14 is unscrewed from the shaft 2. The cord 16 is then wound up, the oven 7 removed from over the tank 6, and the tank 6 prepared for operation by replacing its lid and securing the support 1 in its rotary bearing.

To remove grown crystals from the tank 6, the procedure is reversed. The oven 7 is brought to the temperture of the solution and crystals in the tank 6, and is positioned, with the movable part 13 withdrawn, over the tank 6, from which the lid has been removed. The bolt 14 is screwed in to the shaft 2 and as before the rubber band 21 is slipped over the gap between the rim 11 and the lip of the tank 6, which thereby becomes together with the oven 7 a continuous uniform temperature enclosure. The winch 19 is wound up to withdraw the support 1 and the grown crystals from the tank 6 into the oven 7, and the movable part 13 is pushed back to cover the hole 11. The autotransformer is adjusted to bring the temperature of the oven 7 very gradually to the ambient temperature and then maintain it at that temperature, when the movable part 13 is again withdrawn and the support 1 and the grown crystals are lowered through the hole 11 out of the oven 7, the oven having previously been removed from its position over the tank 6 at any convenient time after the hole 11 had been closed by the moving part 13.

As an additional precaution to prevent cracking of crystals during the process of removing them from the tank, it has been found necessary to keep the interior of the oven 7 humid, a relative humidity of 50–60% being found satisfactory. For this purpose cloths are suspended from the tops of the oven walls, the bottoms of the cloths dipping into jars of water which are mounted in holders towards the bottom of the oven 7. The humidity of the oven 7 prevents cracking which occurs otherwise due to rapid local cooling of the crystal surfaces due to evaporation when wet crystals are raised from the tank 6 into the dry oven 7.

To facilitate movement of the oven 7, it may conveniently be mounted on a steel frame with a wheeled base, so that it may be wheeled into position over the tank 6. This is particularly convenient where one oven is provided for use with a number of similar crystal growing tanks.

In a smaller modified version of the oven described above, it is constructed lightly so as to be readily portable and to rest on the lip of the tank 6 when in use. The rim is omitted and instead rubber feet are secured to the underside spaced round a circle so that on resting the oven on top of a tank the feet fit round outside of the lip of the tank and locate it in position relative to the tank.

I claim:

1. A process of growing a single crystal from a seed crystal by immersion in a super-saturated solution of the crystalline material in a crystal growing tank, the top of which has an opening, the initial temperature of the solution in the tank being different from the temperature of the surroundings and the seed crystal lying initially outside the tank, including a method of inserting a seed crystal in the crystal growing tank comprising the steps of bringing to substantially the same temperature as the seed crystal a temperature-controllable enclosure the floor of which has an opening and is provided with a movable part for closing said floor opening, then mounting the seed crystal on a support in said enclosure, then with the floor opening closed by said part slowly bringing the temperature of the enclosure to the temperature of the solution in the crystal growing tank, then maintaining the temperature of the enclosure at said temperature of the crystal growing tank, then arranging the enclosure and the tank in position with the enclosure covering fully the opening in the top of the crystal growing tank and with the opening in the tank registered with the opening in the enclosure, then moving the movable part of the enclosure away from the floor opening so that the crystal growing tank and the enclosure mutually form substantially a continuous uniform-temperature enclosure, and then lowering the support with the seed crystal mounted on it through said openings into the crystal growing tank.

2. A process of growing a single crystal from a seed crystal by immersion in a super-saturated solution of the crystalline material in a crystal growing tank, the top of which has an opening, the final temperature of the solution in the tank being different from the temperature of the surroundings, including a method of removing a crystal from the crystal growing tank into the surroundings comprising the steps of bringing to substantially the same temperature as the crystal in the crystal growing tank a temperature-controllable enclosure the floor of which has an opening and is provided with a movable part for closing said opening, said enclosure being brought to said temperature with the floor opening closed by said part, then arranging the enclosure and the crystal growing tank in position with the enclosure fully covering the opening in the tank and with the openings of the tank and enclosure in registry, then moving the movable part of the enclosure away from the floor opening so that the tank and enclosure mutually form a substantially continuous uniform-temperature enclosure, then raising a support on which the crystal is mounted in the tank from the tank through the openings into the enclosure, then moving the movable part back into position closing the floor opening, then gradually bringing the temperature of the enclosure to that of said surroundings, and then removing the crystal from the enclosure into said surroundings.

3. A method according to claim 2 comprising the additional step of at least partially saturating the air within the temperature controlled enclosure with the vapor of the solvent of the solution in the crystal growing tank, before the step of raising the support and crystals into the enclosure, and maintaining that condition while the crystals are in the enclosure.

4. A process of growing a single crystal from a seed crystal by immersion in a super-saturated solution of the crystalline material in a crystal growing tank, the top of which has an opening, the initial and final temperatures of the solution in the tank being different from the temperature of the surroundings, though not necessarily different from one another, and the seed crystal lying initially outside the tank, said process comprising the steps of bringing to substantially the same temperature as the seed crystal a temperature-controllable enclosure, the floor of which has an opening and is provided with a movable part for closing said floor opening, then mounting the said crystal on a support in said enclosure, then with the floor opening closed by said part slowly bringing the temperature of the enclosure to the initial temperature of the solution in the crystal growing tank, then maintaining the temperature of the enclosure at the initial temperature of the solution in the crystal growing tank, then arranging the enclosure and the tank in position with the enclosure covering fully the opening in the top of the crystal growing tank and with the opening in the tank registered with the opening in the enclosure, then moving the movable part of the enclosure away from the floor opening so that the crystal growing tank and the enclosure mutually form substantially a continuous uniform-temperature enclosure, then lowering the support with the seed crystal mounted on it through said openings into the crystal growing tank, then carrying out a crystal growth run under controlled conditions in which crystalline material is deposited on the seed crystal and at the end of which run the solution temperature is said final temperature, then bringing substantially to said final temperature said temperature-controllable enclosure the floor of which has an opening and is provided with a movable part for closing said floor opening, said enclosure being brought to said final temperature with the floor opening closed by said part, then arranging the enclosure and the crystal growing tank in position with the enclosure fully covering the opening in the tank and with the openings of the tank and the enclosure in registry, then moving the movable part of the enclosure away from the floor opening so that the tank and enclosure mutually form substantially a continuous uniform-temperature enclosure, then raising the said support with the crystal mounted on it from the tank through the openings into the enclosure, then moving the movable part of the enclosure back into positions to close the floor opening, then gradually bringing the temperature of the enclosure to the ambient temperature, and then removing the crystal from the enclosure into the surroundings.

References Cited in the file of this patent

UNITED STATES PATENTS

| 1,578,677 | Nicolson | Mar. 30, 1926 |
| 1,906,757 | Kjellgren | May 2, 1933 |
| 1,959,215 | Owen | May 15, 1934 |
| 2,026,165 | Goodwillie | Dec. 31, 1935 |
| 2,483,647 | Kjellgren | Oct. 4, 1949 |
| 2,604,385 | Chambers | July 22, 1952 |

OTHER REFERENCES

Walker: Bell Laboratories Record, vol. XXV, No. 10, Oct. 1947, page 358.

Schrader, Alien Property Custodian Serial No. 405,411 June 1, 1943.